(12) United States Patent
Mack

(10) Patent No.: US 8,056,906 B2
(45) Date of Patent: Nov. 15, 2011

(54) SELF-TIGHTENING DRILL CHUCK

(75) Inventor: Hans-Dieter Mack, Sontheim (DE)

(73) Assignee: Roehm GmbH, Sontheim (DE)

( * ) Notice: Subject to any disclaimer, the term of this patent is extended or adjusted under 35 U.S.C. 154(b) by 1208 days.

(21) Appl. No.: 11/716,305

(22) Filed: Mar. 9, 2007

(65) Prior Publication Data
US 2008/0217869 A1   Sep. 11, 2008

(30) Foreign Application Priority Data

Mar. 11, 2006  (DE) .......................... 10 2006 011 344

(51) Int. Cl.
*B23B 31/16*  (2006.01)
(52) U.S. Cl. ........................... 279/64; 279/140; 279/902
(58) Field of Classification Search .............. 279/60–65, 279/140, 902
See application file for complete search history.

(56) References Cited

U.S. PATENT DOCUMENTS

| | | | | |
|---|---|---|---|---|
| 3,970,323 A | * | 7/1976 | Schnizler, Jr. ................. | 279/64 |
| 4,266,789 A | * | 5/1981 | Wahl et al. ..................... | 279/60 |
| 4,302,021 A | * | 11/1981 | Rohm ............................. | 279/60 |
| 5,499,830 A | * | 3/1996 | Schnizler ....................... | 279/62 |
| 7,503,565 B2 | * | 3/2009 | Rohm ............................. | 279/60 |
| 7,726,663 B2 | * | 6/2010 | Mack et al. .................... | 279/60 |
| 7,726,917 B2 | * | 6/2010 | Mack ............................ | 408/124 |
| 7,841,601 B2 | * | 11/2010 | Mack ............................. | 279/60 |
| 2006/0208435 A1 | | 9/2006 | Rohm | |

FOREIGN PATENT DOCUMENTS

WO   2006/111114   10/2006

* cited by examiner

*Primary Examiner* — Eric A Gates
*Assistant Examiner* — Bayan Salone
(74) *Attorney, Agent, or Firm* — Andrew Wilford

(57) ABSTRACT

A drill chuck has a chuck body, a jaw holder element rotatable on the body and formed with a plurality of angularly spaced guides, and a sleeve element surrounding the holder element and body. Jaws in the guides can be shifted in the guides forward and together on rotation of the holder element in a tightening direction relative to the body and oppositely on rotation of the holder element relative to the body in an opposite loosening direction. Interengaging formations on the sleeve element and on the body limit relative angular movement of the sleeve element on the body between a pair of angularly offset end positions. An annular array of teeth rotationally fixed to the sleeve element can be engaged by a pawl angularly fixed on the holder element. A release ring rotatable the body rearward of the sleeve is rotationally coupled to one of the elements.

7 Claims, 3 Drawing Sheets

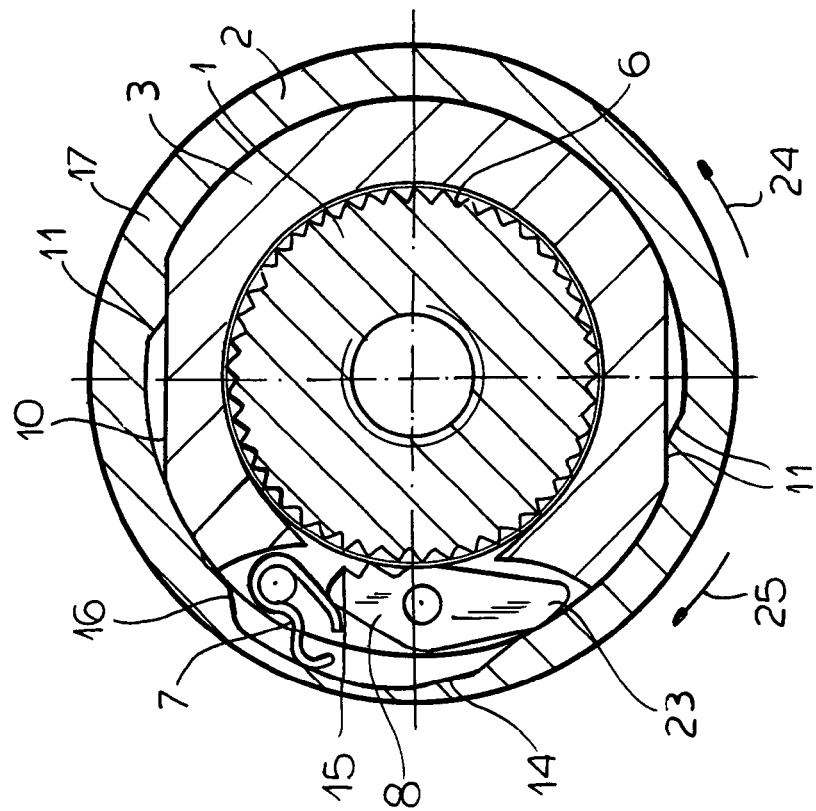
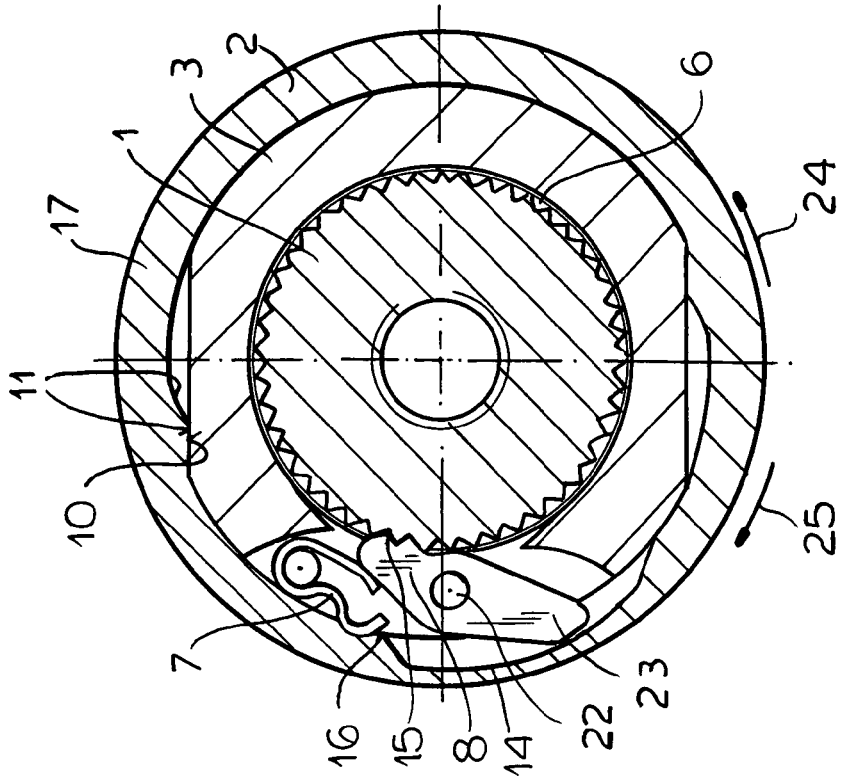

SELF-TIGHTENING DRILL CHUCK

FIELD OF THE INVENTION

The present invention relates to a drill chuck. More particularly this invention concerns a self-tightening drill chuck.

BACKGROUND OF THE INVENTION

A self-tightening drill chuck has a chuck body, a tightening sleeve that can rotate coaxially to the chuck body, and a jaw holder supported on the chuck body in which jaws are guided in guide slots. The jaws can be adjusted by the jaw holder by a relative rotation between the chuck body and the tightening sleeve for tensioning and loosening. A locking device comprises an annular array of teeth coaxial with the chuck axis and a pawl that engages under the force of a spring into the gear ring and is supported on the jaw holder. This locking device locks the chuck body and the pawl against relative rotations for loosening the jaws when the pawl has engaged into the teeth but does not hinder relative rotation tightening. A stop formation on the jaw holder and a counterstop formation on the tightening sleeve limit relative rotation of the tightening sleeve relative to the jaw holder between a first rotational end position corresponding to the engaged state or locking position of the pawl and to a second rotational position corresponding to the disengaged state or a freeing position. A latch with a seat associated with the first rotational position and with another seat associated with the second rotational position is provided between the jaw holder and the tightening sleeve. This latch does not release rotation of the tightening sleeve relative to the jaw holder at least in the tightening direction until a predetermined tensioning force has been achieved.

Such a drill chuck is known from WO 2006/111114. It has the advantage of a simplified manipulation in comparison to earlier known self-tightening drill chucks since the user need merely grasp and rotate the tightening sleeve in order to achieve the tightening or loosening of the drill chuck as a function of the direction of rotation selected. However, it has turned out to be possible on account of the self-tightening property of the drill chuck in certain areas of application that the drill chuck can self tighten to such an extent that it can no longer be opened manually.

OBJECTS OF THE INVENTION

It is therefore an object of the present invention to provide an improved self-tightening drill chuck.

Another object is the provision of such an improved self-tightening drill chuck that overcomes the above-given disadvantages, in particular that is set up so that, even if clamped so tight that it cannot be opened by hand, there is a way to loosen it.

SUMMARY OF THE INVENTION

A drill chuck has according to the invention a chuck body centered on and rotatable about an axis, a jaw holder element rotatable on the body and formed with a plurality of angularly spaced guides, and a sleeve element surrounding the holder element and body. Respective jaws in the guides between the sleeve element and the body can be shifted in the guides forward and together on rotation of the holder element in a tightening direction relative to the body and oppositely on rotation of the holder element relative to the body in an opposite loosening direction. Interengaging formations on the sleeve element and on the body limit relative angular movement of the sleeve element on the body between a pair of angularly offset end positions. A latch releasably retains the sleeve element in the end positions. An annular array of teeth rotationally fixed to the sleeve element can be engaged by a pawl angularly fixed on the holder element. The pawl and the array of teeth are oriented such that when the pawl is in a locking position engaged with the array of teeth the holder element can rotate relative to the body in the tightening direction but not in the loosening direction and when in a freeing position disengaged from the teeth the holder element can rotate freely in either direction relative to the body. A spring urges the pawl into the locking position, and a cam between the sleeve element and the pawl displaces the pawl into the locking position in one of the end positions of the sleeve element and displacing the pawl into the freeing position in the other end position of the sleeve element. In accordance with the invention a release ring rotatable the body rearward of the sleeve element is operatively rotationally coupled to one of the elements for operating same and loosening the chuck.

In the state of the art a grip casing is frequently connected at the axially rear end of the chuck body to the chuck body in such a manner that it cannot rotate in unison with the body in order to be able to hold it fast with one hand while the other hand of the user is used to rotate components necessary for adjusting the jaws. Such a nonrotatable grip casing is however frequently unnecessary since modern drills have a spindle stop that can arrest rotation of the chuck body. This results in the possibility of utilizing the area on the chuck body that was previously reserved for the grip casing for the rotatable release ring, which offers the user an enlarged contact surface for the inner surface of his hand in a very simple embodiment and thus facilitates the transfer of the torque required for opening the drill chuck.

However, there is also the advantageous possibility that the release ring is formed with at least one radial opening for receiving a tool. In this embodiment a tool can be introduced into this radial opening to facilitate the creation of the required torque for opening and also for closing by means of a long lever arm, e.g. a rod or the like inserted in the opening.

It is advantageous if the radial opening is designed as a blind hole with a lining jacket consisting of a material tolerating high load, preferably metal. This makes it possible to make the release ring from a material, especially plastic, that tolerates only lower loads, without losing its suitability for transferring the required torque because the required mechanical properties are made available by the lining.

There is the possibility within the scope of the invention that the release ring is coupled to the latch namely, its control sleeve comprising a control cam. Alternatively, there is also the possibility that the release ring is coupled to the jaw holder, so that the user can act directly by a rotation of the release ring on the components serving for the adjustment of the jaws. Note in this connection that even simultaneous action of the release ring on the control sleeve and the jaw holder is conceivable; however, care is to be taken that a relative ability of the control sleeve to rotate relative to the jaw holder be provided for in order to actuate the latch.

The presence of the release ring on the axially rear end of the chuck body can also be used in such a manner that the release ring serves to axially rearwardly support the jaw holder, to which end the release ring is advantageously axially secured on the chuck body by a retaining ring.

BRIEF DESCRIPTION OF THE DRAWING

The above and other objects, features, and advantages will become more readily apparent from the following description, reference being made to the accompanying drawing in which:

FIGS. 2a and 2b are sections taken along line II-II respectively in the latching and freeing positions.

SPECIFIC DESCRIPTION

Figure 1:
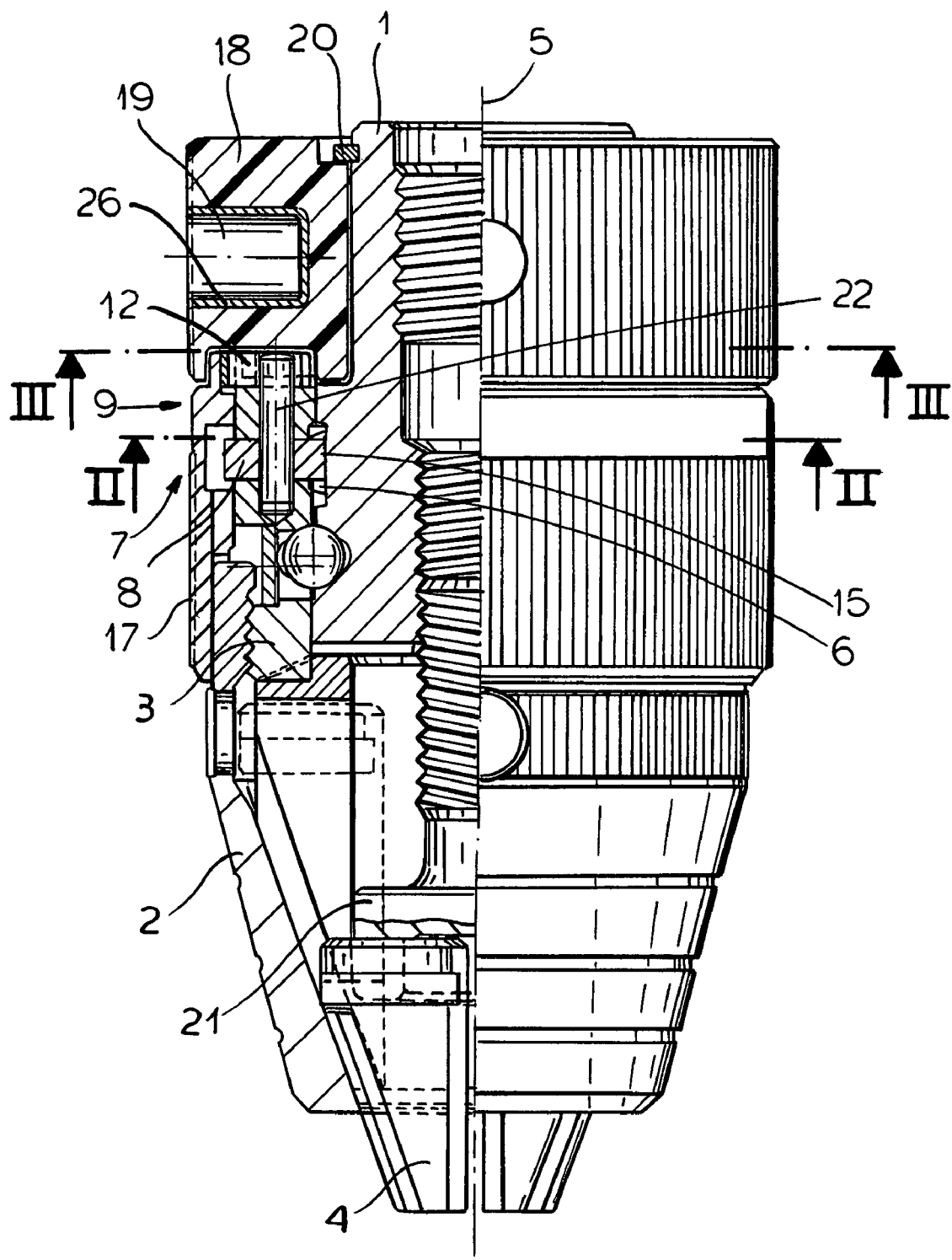
FIG. 1 is a side view partly in axial section through the chuck according to the invention.

As seen in FIG. 1 a self-tightening drill chuck has a chuck body 1 centered on and rotatable about an axis 5. A tightening sleeve 2 is axially fixed but rotatable about the axis 5 on the body 1 and is rotationally couplable as described below to a jaw holder 3 rotatable but axially fixed on the body 1 and formed with three angularly equispaced guide slots holding respective jaws 4 that ride on the frustoconical inner surface of the front end of the sleeve 2. A pusher body 21 has a front end formed with seats fitting with rear ends of the jaws 4 and a rear end threaded into the chuck body 1. Thus the holder 3, jaws 4, and pusher 21 are rotationally coupled to each other so that when they are is rotated in one direction the jaws 4 are pushed together and out (down in FIG. 1) for closing/tightening the chuck and when oppositely rotated the jaws 4 move apart and in for opening/loosening the chuck.

According to the invention the chuck body 1 is formed with an annular array of radially outwardly projecting triangular teeth 6 (FIGS. 2A and 2B). A pawl 8 is pivoted on a pin 22 fixed in the holder 3 and extending parallel to the axis 5. This pawl has one end formed as a tooth 15 and an opposite end 23 engageable in a cam 14 formed as an internal recess in a sleeve 17 rotationally fixed to the sleeve 2. This sleeve 17 is also carries a pair of diametrically opposite inwardly projecting limiting bumps 11 that are accommodated by flats or recesses 10 formed in the holder 3, so as to limit the angular displacement of the sleeves 2 and 17 on the holder 3 between a pair of angularly offset end positions shown in FIGS. 2A and 2B. In addition a spring 7 urges the tooth end 15 of the pawl 8 radially inward to engage between the teeth 6. Adjacent the cam 14 is another cam 16 that can pivot the spring 7 between the active position shown in FIG. 2A pressing the teeth 156 into mesh with the teeth 6 and the inactive position of FIG. 2B allowing the teeth 15 to unmesh from the teeth 6.

Figure 3B:
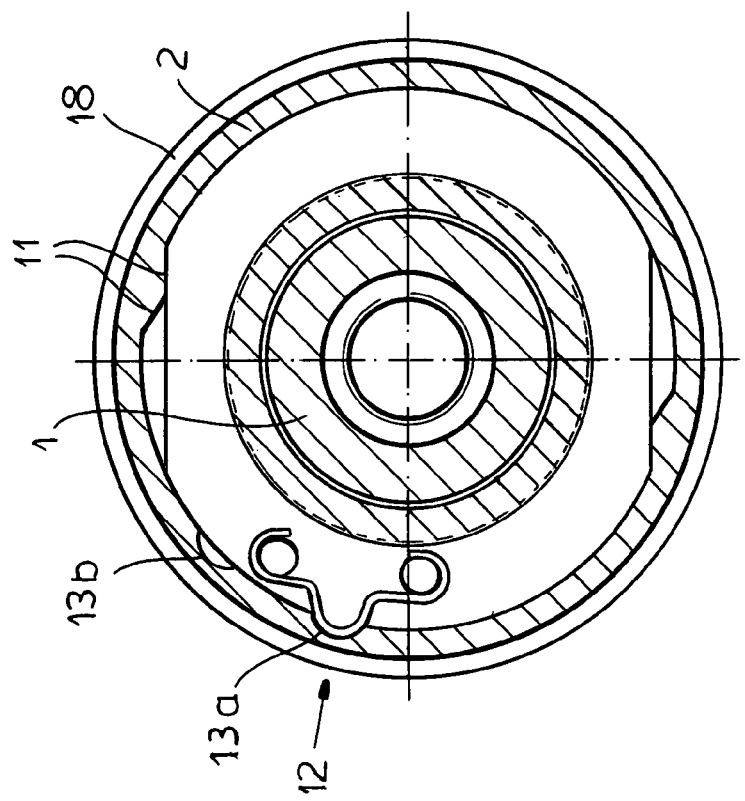
FIGS. 3a and 3b are sections taken along line III-III respectively in the latching and freeing positions.
Figure 3A:
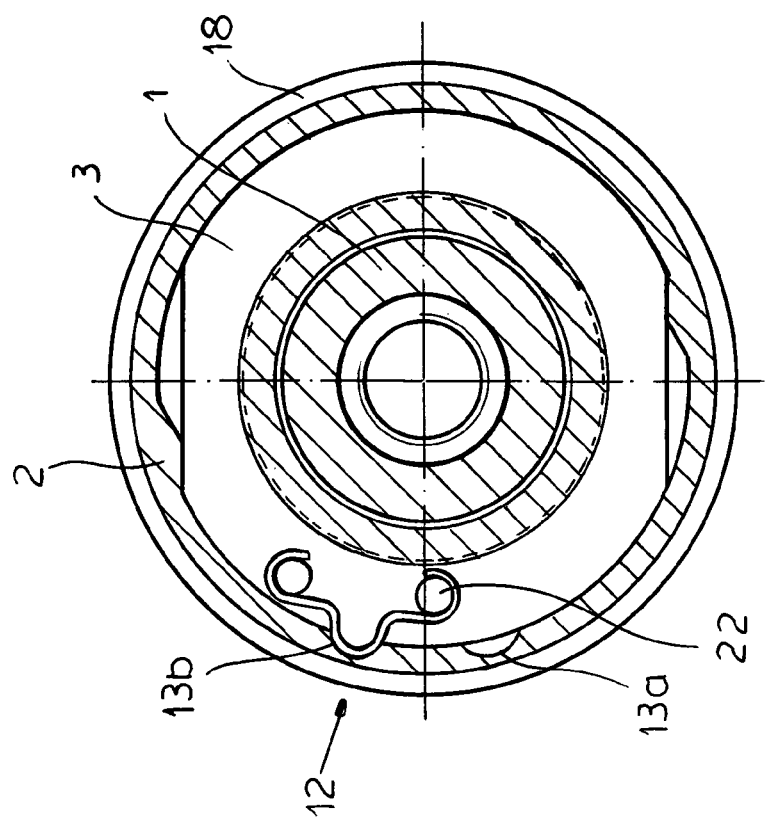

FIGS. 3A and 3B show a retaining system comprised of a spring 12 fixed on pins on the holder 3 and engageable in either of two radially inwardly open sets 13a and 13b formed in the sleeve 17. This spring 12 therefore releasably retains the sleeves 2 and 17 in the end positions shown in FIGS. 2A, 2B, 3A, and 3B. A ring 18 rearwardly closes the chuck, held in place by a snap ring 20 set in the body 1 and formed with radially outwardly open metal-lined blind holes 19. This ring 18 is rotationally coupled via the sleeve 17 to the sleeve 2, so that the entire outside surface of the chuck is formed by these parts 2, 17 and 18 that are rotationally coupled together.

In the FIG. 2A locking position the tooth end 15 engages in the teeth 6 and the sleeves 2 and 17 can only rotate in a tightening direction 24 that shifts the jaws 4 forward and together. Opposite rotation in a loosening direction 25 is inhibited in this position. In the freeing position of FIG. 2b rotation is possible in both directions 24 and 25.

Assuming the chuck is in the position of FIGS. 2A and 3A and the jaws 4 are tightly gripping a tool or workpiece and it is desired to loosen or open the chuck, the user will grip the sleeves 2 and 17, and the ring 18, and rotate them in the direction 18. Since the chuck is tight, the jaws 4 will resist rotation, along with the holder 3 and pusher 21, and the spring 12 will jump out of the seat 13a. With no effect on the jaws 4, these parts 2, 17, and 18 will move angularly until the cam 14 pivots out the pawl 8 and the bumps 11 seat at the opposite ends of the flats 10, that is move into the FIG. 2B position. Further rotation once this position is reached will entrain the body 3, jaws 4, and pusher 21 to retract the jaws 4 back into the chuck. The cam 16 will disengage the spring 7 to allow the pawl 8 to sit in the inactive position.

Opposite actuation of the sleeves 2 and 17 in direction 24 to tighten the chuck, presuming the parts are in the FIG. 2b position will, first of all, move the spring 7 in with the cam to push the teeth 15 of the pawl 8 that is simultaneously released by the cam 14. Continued rotation will bring the bumps 11 to the opposite ends of the flats and cause the sleeves 2 and 7 and the ring 18 to rotate jointly with the holder 3, causing the pawl teeth 15 to ratchet on the teeth 6. Rotation continues in the tightening direction 24 until the chuck is as tight as the user wants it.

In the chuck is overtightened so that the user cannot manually loosen or open it, the user puts a pin in one of the holes 19 so as to gain leverage and can this way exert enough torque to release the jaws 4. Alternately it is within the scope of this invention to couple the ring 18 to the body 3.

I claim:

1. A drill chuck comprising:

a chuck body centered on and rotatable about an axis;

a jaw holder element rotatable on the body and formed with a plurality of angularly spaced guides;

a sleeve element surrounding the holder element and body;

respective jaws in the guides between the sleeve element and the body;

means for shifting the jaws in the guides forward and together on rotation of the holder element in a tightening direction relative to the body and for opposite shifting of the jaws on rotation of the holder element relative to the body in an opposite loosening direction;

interengaging formations on the sleeve element and on the jaw holder element limiting relative angular movement of the sleeve element on the jaw holder element between a pair of angularly offset end positions;

latch means releasably retaining the sleeve element in the end positions;

an annular array of teeth rotationally fixed to the body;

a pawl angularly fixed on the holder element and having a tooth engageable with the teeth, the pawl tooth and the array of teeth being oriented such that when the pawl tooth is in a locking position engaged with the array of teeth the holder element can rotate relative to the body in the tightening direction but not in the loosening direction and when in a freeing position disengaged from the teeth the holder element can rotate freely in either direction relative to the body;

spring means for urging the pawl into the locking position;

cam means between the sleeve element and the pawl for displacing the pawl into the locking position in one of the end positions of the sleeve element and for displacing the pawl into the freeing position in the other end position of the sleeve element; and a plastic release ring rotatable on the body rearward of the sleeve element and rotationally coupled to one of the elements for operating same, for joint rotation therewith, and for loosening and tightening the chuck, the release ring being formed with at least one radially outwardly open blind hole lined with metal and adapted to receive a tool.

2. The drill chuck defined in claim 1 wherein the sleeve and release ring together form generally all of the radially outwardly directed surfaces of the chuck.

3. The drill chuck defined in claim 2 wherein the release ring is axially fixed on the body and axially rearwardly abuts and supports the sleeve.

4. The drill chuck defined in claim 1 wherein the release ring is rotationally coupled to the sleeve element.

5. The drill chuck defined in claim 1 wherein the release ring is rotationally coupled to the holder element.

6. The drill chuck defined in claim 1, further comprising
a retaining ring seated in the chuck body and bearing axially forward on the release ring.

7. A drill chuck comprising:
a chuck body centered on and rotatable about an axis;
a jaw holder element rotatable on the body and formed with a plurality of angularly spaced guides;
a sleeve element surrounding the holder element and body;
respective jaws in the guides between the sleeve element and the body;
means for shifting the jaws in the guides forward and together on rotation of the holder element in a tightening direction relative to the body and for opposite shifting of the jaws on rotation of the holder element relative to the body in an opposite loosening direction;
interengaging formations on the sleeve element and on the jaw holder element limiting relative angular movement of the sleeve element on the jaw holder element between a pair of angularly offset end positions;
latch means releasably retaining the sleeve element in the end positions;
an annular array of teeth rotationally fixed to the chuck body;
a pawl angularly fixed on the holder element and having a tooth engageable with the array of teeth, the pawl tooth and the array of teeth being oriented such that when the pawl tooth is in a locking position engaged with the array of teeth the holder element can rotate relative to the body in the tightening direction but not in the loosening direction and when in a freeing position disengaged from the teeth the holder element can rotate freely in either direction relative to the body;
spring means for urging the pawl into the locking position;
cam means between the sleeve element and the pawl for displacing the pawl into the locking position in one of the end positions of the sleeve element and for displacing the pawl into the freeing position in the other end position of the sleeve element;
a plastic release ring rotatable the body rearward of the sleeve element, formed with least one radially outwardly open blind hole adapted to receive a tool, and operatively rotationally coupled to one of the elements for operating same and loosening the chuck; and
a metal liner in the hole.

* * * * *